(12) United States Patent
Davis

(10) Patent No.: US 11,579,603 B2
(45) Date of Patent: Feb. 14, 2023

(54) PST TECHNIQUE FOR PREDICTIVE MAINTENANCE AND BATTERY TUNING AND MANIFOLD DISTRIBUTION COMPENSATION

(71) Applicant: CiDRA Corporate Services LLC, Wallingford, CT (US)

(72) Inventor: Michael A. Davis, Glastonbury, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 982 days.

(21) Appl. No.: 16/335,447

(22) PCT Filed: Sep. 21, 2017

(86) PCT No.: PCT/US2017/052634
§ 371 (c)(1),
(2) Date: Mar. 21, 2019

(87) PCT Pub. No.: WO2018/057689
PCT Pub. Date: Mar. 29, 2018

(65) Prior Publication Data
US 2020/0019151 A1   Jan. 16, 2020

Related U.S. Application Data

(60) Provisional application No. 62/397,601, filed on Sep. 21, 2016.

(51) Int. Cl.
*G05B 23/02* (2006.01)
*G01N 15/02* (2006.01)
(Continued)

(52) U.S. Cl.
CPC .......... *G05B 23/0283* (2013.01); *G01N 15/02* (2013.01); *B01D 17/0217* (2013.01); *G01N 1/2211* (2013.01)

(58) Field of Classification Search
CPC .............. G01N 15/02; G01N 15/0255; G01N 2015/0053; B03B 5/34; B03B 13/00;
(Continued)

(56) References Cited

U.S. PATENT DOCUMENTS 4,219,409 A   8/1980  Liller
4,282,088 A * 8/1981  Ennis ....................... B03B 5/36
                                                   209/172.5
(Continued)

*Primary Examiner* — Joseph C Rodriguez
(74) *Attorney, Agent, or Firm* — Ware, Fressola, Maguire & Barber LLP

(57) ABSTRACT

A particle size tracking system for providing predictive maintenance and battery tuning of hydrocyclones arranged in a battery configuration, featuring a control having a signal processor configured to: receive signaling containing information about particle sizes of material flowing in pipes of hydrocyclones arranged in a battery configuration; and determine corresponding signaling containing information to control the operation of each hydrocyclone arranged in the battery configuration, based upon the signaling received. The signal processor may be configured to provide the corresponding signal as control signaling to control the operation of each hydrocyclone arranged in the battery configuration.

28 Claims, 3 Drawing Sheets

A system 10 for predictive maintenance and battery tuning and manifold distribution compensation A control 11 having a signal processor 12 configured at least to:

receive signaling containing information about particle sizes of material flowing in pipes of hydrocyclones arranged in a battery configuration;

determine corresponding signaling containing information to control the operation of each hydrocyclone arranged in the battery configuration, based upon the signaling received; and/or provide the corresponding signaling as a control signal to control the operation of each hydrocyclone arranged in the battery configuration.

Other signal processor circuits or components 14 that do not form part of the underlying invention, e.g., including input/output modules, one or more memory modules, data, address and control busing architecture, etc.

The System 10

(51) Int. Cl.
*B01D 17/02* (2006.01)
*G01N 1/22* (2006.01)

(58) Field of Classification Search
CPC ..... B02C 23/20; B02C 25/00; G05B 23/0283; G05B 23/0286; G05B 23/0294
See application file for complete search history.

(56) References Cited

U.S. PATENT DOCUMENTS

| | | |
|---|---|---|
| 4,736,311 A | 4/1988 | Takeuchi et al. |
| 6,143,183 A | 11/2000 | Wardwell et al. |
| 8,706,287 B2 * | 4/2014 | Gocht ..................... B02C 25/00 241/34 |
| 10,394,207 B2 * | 8/2019 | Van Der Spek ........ B04C 11/00 |
| 11,260,399 B2 * | 3/2022 | Maron ..................... B03B 7/00 |
| 2011/0314929 A1 | 12/2011 | Limacher et al. |
| 2012/0209550 A1 * | 8/2012 | Van Der Spek ....... G01N 15/10 702/63 |
| 2016/0207050 A1 | 7/2016 | Van Der Spek et al. |
| 2020/0038782 A1 * | 2/2020 | Bose ..................... C02F 1/5209 |

\* cited by examiner

A system 10 for predictive maintenance and battery tuning and manifold distribution compensation A control 11 having a signal processor 12 configured at least to:

receive signaling containing information about particle sizes of material flowing in pipes of hydrocyclones arranged in a battery configuration;

determine corresponding signaling containing information to control the operation of each hydrocyclone arranged in the battery configuration, based upon the signaling received; and/or provide the corresponding signaling as a control signal to control the operation of each hydrocyclone arranged in the battery configuration.

Other signal processor circuits or components 14 that do not form part of the underlying invention, e.g., including input/output modules, one or more memory modules, data, address and control busing architecture, etc.

Figure 1: The System 10

20

20a: Receiving, with a signal processor 12, signaling containing information about particle sizes of material flowing in pipes of hydrocyclones arranged in a battery configuration 20b: Determining, with the signal processor 12, corresponding signaling containing information to control the operation of each hydrocyclone arranged in the battery configuration, based upon the signaling received; and/or 20c: Providing, with the signal processor 12, the corresponding signaling as a control signal to control the operation of each hydrocyclone arranged in the battery configuration, based upon the signaling received Figure 2: The Basic Method Having a Flowchart 20

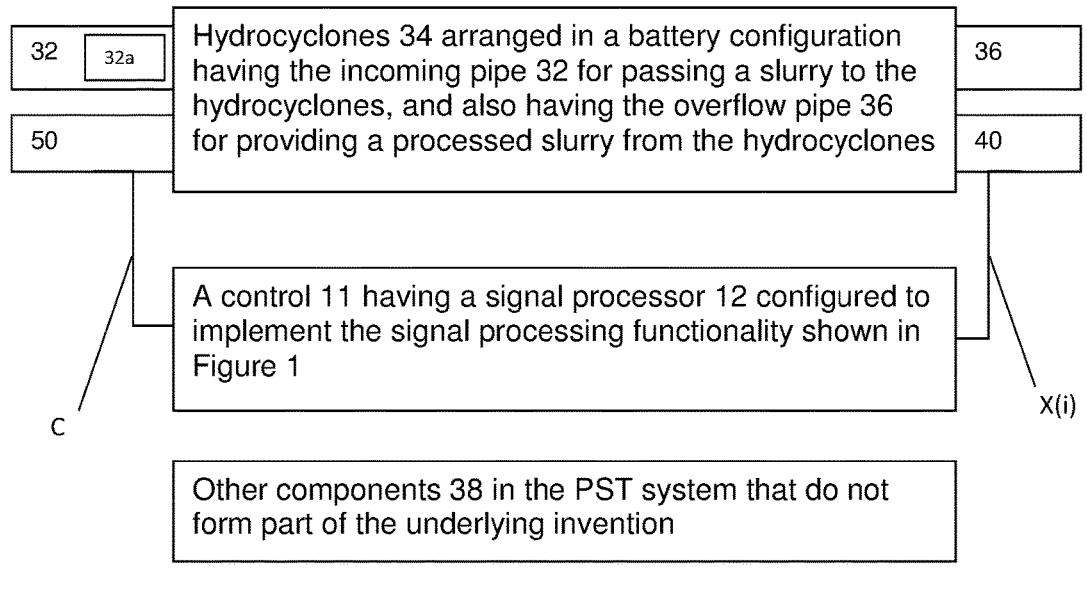
Figure 3: The Particle Size Tracking (PST) System 30

PST TECHNIQUE FOR PREDICTIVE MAINTENANCE AND BATTERY TUNING AND MANIFOLD DISTRIBUTION COMPENSATION

CROSS-REFERENCE TO RELATED APPLICATIONS

This application claims benefit to provisional patent application Ser. No. 62/397,601, filed 21 Sep. 2016; which is incorporated by reference in its entirety.

OTHER RELATED APPLICATIONS

This application is related to PCT patent application serial no. PCT/US2016/0167721, filed 5 Feb. 2016, which claims benefit to provisional patent application Ser. No. 62/112,433, filed 5 Feb. 2015, which are both incorporated by reference in their entirety.

This application is related to PCT patent application serial no. PCT/US2016/015334, filed 28 Jan. 2016, which claims benefit to provisional patent application Ser. No. 62/108,689, filed 25 Jan. 2015, and which corresponds to U.S. patent application Ser. No. 15/084,420, filed 28 Feb. 2013, which are all incorporated by reference in their entirety.

This application is related to PCT patent application serial no. PCT/US2014/52628, filed 26 Aug. 2014, which claims benefit to provisional patent application Ser. No. 61/869,901, filed 26 Aug. 2013, and which corresponds to U.S. patent application Ser. No. 14/914,048, filed 24 Feb. 2016, which are all incorporated by reference in their entirety.

This application is related to PCT patent application serial no. PCT/US2014/012510, filed 22 Jan. 2014, which claims benefit to provisional patent application Ser. No. 61/755,305, filed 22 Jan. 2013, and which corresponds to U.S. patent application Ser. No. 14/762,223, filed 21 Jul. 2015, which are all incorporated by reference in their entirety.

This application is related to PCT patent application serial no. PCT/US2011/050500, filed 6 Sep. 2011, which claims benefit to provisional patent application Ser. No. 61/379,899, filed 3 Sep. 2010, and which corresponds to U.S. patent application Ser. No. 13/820,033, filed 28 Feb. 2013, which are all incorporated by reference in their entirety.

This application is related to PCT/US2010/45178, filed 11 Aug. 2010, which claims benefit to provisional patent application serial nos. 61/232,875, filed 11 Aug. 2009; Ser. No. 61/400,819, filed 2 Aug. 2010; and Ser. No. 61/370,154, filed 3 Aug. 2010, and which corresponds to patent application Ser. No. 13/389,546, filed 24 Apr. 2012, which are all incorporated by reference in their entirety.

This application is related to PCT/US10/38281, filed 11 Jun. 2010, which claims benefit to provisional patent application serial nos. 61/186,502, 12 Jun. 2009, and which corresponds to U.S. patent application Ser. No. 13/377,083, filed 21 Feb. 2012, which are all incorporated by reference in their entirety.

This application is also related to PCT/US2009/043438, filed 11 May 2009, which claims benefit to provisional patent application serial nos. 61/051,775 (CC-0962P), 61/051,791, and 61/051,803, all filed 9 May 2008, and which corresponds to patent application Ser. No. 12/991,636, filed 1 Feb. 2011, which are all incorporated by reference in their entirety.

The aforementioned applications were all assigned to the assignee of the present application, which builds on this family of technology.

BACKGROUND OF THE INVENTION

1. Field of Invention

This invention relates to techniques for maintaining, tuning and controlling one or more hydrocyclones in a battery configuration; and more particularly, to techniques for predictive maintenance and battery tuning, as well as manifold distribution compensation, for controlling the operation of one or more hydrocyclones in a battery configuration using particle size tracking and detection.

2. Description of Related Art

Particle Size Tracking (PST) systems, e.g., developed by the assignee of the present invention, are designed to give a direct real-time indication of the particle size trending within a pipe, typically in the overflow of a hydrocyclone. This information can be used directly as part of a feedback system to optimize grinding circuits in minerals processing and has demonstrated the ability to provide large impacts in material recovery.

However, the inventor of the present invention believes that there are many other areas of plant operations that the unique information PST provides can be utilized, e.g., including to provide a better way to predictive maintenance and battery tuning for hydrocyclones in a battery configuration.

SUMMARY OF THE INVENTION

The Basic Invention

The present invention provides several applications for using this PST information outside of direct particle size control of the operation of hydrocyclones in a battery configuration.

In operation, the assignee's PST system provides particle size information for each hydrocyclone in a battery and therefore has a unique look into the operation of each cyclone versus the performance of the whole battery, which opens up several impact areas of plant optimization including:
1. Predictive maintenance,
2. Manifold distribution compensation, and
3. Static hydrocyclone balancing.

Predictive Maintenance

The PST system can help provide information on the separation performance of each hydrocyclone in a battery and give trending information that can help to predict the maintenance needs of each hydrocyclone. As an example: an ideally operating battery of cyclones will have each cyclone in operation passing the same amount of material and at all consistent particle sizes. However, as the cyclones wear they no longer perform the same and will therefor pass varying nominal particles sizes for a given set of operational parameters within the cyclone's lifetime. With the PST system this performance degradation of each cyclone can be tracked and trended as compared to the beginning performance of the cyclone and the median performance of all the cyclones in a battery. This trending can then indicate when a cyclone is starting to reach its end-of-life before it begins erratic behavior such as roping or an event happens that can cause battery shutdown. With this indication the cyclone can be relined or reworked to restore its integrity on a planned basis rather than taking a reactionary approach to cyclone maintenance.

Manifold Distribution Compensation

The individual cyclone information that the PST system provides can allow the control of individual cyclones to optimize performance of the whole battery. Typically plants have looked to control the overall feed to a battery by looking at the consolidated output of the battery and adjusting to optimize performance. This control consists of things like battery pressure, flow, density among others. However, often all the cyclones in a battery are not behaving the same so optimum performance is not achieved by just adjusting the whole battery feed, instead individual cyclone control can be used. As an example: the particle size that a hydrocyclone passes is directly dependent on the flow or pressure that the cyclone sees in its input. Through the use of individual flow control valves on each cyclone the PST data can be used to feed back to each valve to normalize the passing particle size and equalize performance across all the cyclones. A variety of flow valves exist but one example would be industrial pinch valves. This continuous feedback optimization system work well within a plant both when the plant is young but also as the components age. As pumps, valves, manifolds and pipes wear the performance characteristics of each cyclone will change, but this system will actively compensate for it. In addition as the feed material changes, such as different ores or more dense material enters the plant, the cyclones may need to be actively adjusted a well.

Static Hydrocyclone Balancing

One of the limitations of the system detailed in the 2nd technique (i.e., Manifold Distribution Compensation) is that it requires the use of flow valves on each individual hydrocyclone. This may not be achievable in all plants due to space constraints or the cost of the valves and maintenance. However a periodic "static" calibration can be done and adjustments made using the typical gate valves that plants use. (This is similar to the coal balancing that is periodically performed on coal plants without variable valves.) The single feed to a battery of hydrocyclones goes through a manifold that is designed to evenly distribute the incoming feed to the cyclones. However, this can never be perfectly achieved as the flow rates, pressures, feed density all factor into the manifold's distribution pattern, as well as the wear characteristics of the manifold itself. By using the PST individual cyclone data a periodic "balancing" of the cyclones can be done using a manual adjustment of each cyclone's gate valves. These valves typically have only an on and off state, however the on state can limited to a not fully open and therefore be used to give a slight open adjustment. By varying the on states of each cyclone the cyclones can be balanced and more efficient battery performance can be achieved.

Specific Embodiments

According to some embodiments of the present invention, the technique may include, or take the form of, a system for providing predictive maintenance and battery tuning of hydrocyclones arranged in a battery configuration, featuring a control having a signal processor configured to:

receive signaling containing information about particle sizes of material flowing in pipes of hydrocyclones arranged in a battery configuration; and determine corresponding signaling containing information to control the operation of each hydrocyclone arranged in the battery configuration, based upon the signaling received.

The present invention may also include one or more of the following features:

The signal processor may be configured to provide the corresponding signal as control signaling to control the operation of each hydrocyclone arranged in the battery configuration.

The system may include, or form part of, a particle size tracking (PST) system.

Predictive Maintenance

The signaling processor may be configured to store the signaling containing information about the particle sizes of the material flowing in a respective pipe of each hydrocyclone arranged in the battery configuration indexed by date as respective tracked signaling so that performance degradation of each hydrocyclone can be tracked and trended over time. The signaling may also include other information that may factor into a manifold's distribution pattern, e.g., including flow rates, pressures, feed densities, etc., which may be factored into the predictive maintenance and battery tuning analysis and control determination.

The signaling processor may be configured to receive respective current signaling containing information about current particle sizes of material currently flowing in the respective pipe of each hydrocyclone arranged in the battery configuration; and the signaling processor may be configured to determine a respective tracking or trending in the operation of each hydrocyclone arranged in the battery configuration by comparing the respective current signaling to the respective tracked signaling.

The signaling processor may be configured to: determine respective beginning performance signaling containing information about a respective beginning performance of each hydrocyclone based upon the respective tracked signaling stored at the respective beginning of the operation of each hydrocyclone arranged in the battery configuration; and determine the tracking or trending in the operation of each hydrocyclone arranged in the battery by comparing the respective current signaling to the respective beginning performance signaling.

The signaling processor may be configured to: determine median performance signaling containing information about a median performance of all of the hydrocyclones arranged in the battery; and determine the tracking or trending in the operation of each hydrocyclones arranged in the battery by comparing the respective current signaling to the median performance signaling.

The signaling processor may be configured to determine a respective performance degradation of each hydrocyclone based upon the respective tracked signaling containing varying nominal particle sizes for a given set of operational parameters within a lifetime of each hydrocyclone arranged in the battery configuration.

The respective pipe may be an overflow pipe.

Manifold Distribution Compensation

The system may include a manifold, individual particle size detectors, and individual flow control valves. The manifold may be configured to receive the material, and distribute the material flowing to individual input pipes of the hydrocyclones arranged in the battery configuration. Each individual particle size detector may be configured on a respective one of the individual input pipes of the hydrocyclones arranged in the battery configuration. Each individual flow control valve may be configured on the respective one of the individual input pipes of the hydrocyclones arranged in the battery configuration.

Each individual particle size detector may be configured to sense the respective particle sizes of respective material flowing in a respective pipe of a respective hydrocyclone arranged in the battery configuration, and provide respective sensed signaling containing information about the respective particle sizes of the respective material flowing in the respective pipe of the respective hydrocyclone arranged in the battery configuration. The signaling received by the signal processor may contain the respective sensed signaling containing information about the respective particle sizes of the respective material flowing in the respective pipe of all of the respective hydrocyclone arranged in the battery configuration.

The signal processor may be configured to determine the corresponding signaling to control the individual flow control valves on each hydrocyclone arranged in the battery configuration to normalize passing particle sizes and equalize performances across all of the respective hydrocyclone arranged in the battery configuration.

The individual flow control valves may be industrial pinch valves.

Static Hydrocyclone Balancing

The individual flow control valves may be gate valves, each configured to be manually adjusted between an ON state, an OFF state, and intermediate states between the ON state and the OFF state, e.g., in order to implement static hydrostatic balancing of the manifold.

Method Claims

According to some embodiments, the present invention may take the form of a method for providing predictive maintenance and battery tuning of hydrocyclones arranged in a battery configuration, comprising:
  receiving, with a control having a signal processor, signaling containing information about particle sizes of material flowing in pipes of hydrocyclones arranged in a battery configuration; and
  determining, with the control having the signal processor, corresponding signaling containing information to control the operation of each hydrocyclone arranged in the battery configuration, based upon the signaling received.

The method may include providing, with the control having a signal processor, the corresponding signal as control signaling to control the operation of each hydrocyclone arranged in the battery configuration. The control the operation of each hydrocyclone arranged in the battery configuration may include hydrocyclone control functionality other than to optimize grinding circuits, e.g., consistent with that set forth herein.

According to some embodiments, the present invention may take the form of a PST system for predictive maintenance and battery tuning, e.g., featuring a control having a signal processor configured to implement the signal processing functionality set forth above. The PST system may also include one or more other features, e.g., consistent with that set forth above.

The signal processor or signal processor module may include, or take the form of, a signal processor and at least one memory including a computer program code, where the signal processor and at least one memory are configured to cause the control to implement the signal processing functionality of the present invention, e.g., to respond to the signaling received; and determine the corresponding signaling.

According to some embodiment, the present invention may take the form of apparatus comprising means for receiving signaling containing information about particle sizes of material flowing in pipes of hydrocyclones arranged in a battery configuration; and determining corresponding signaling containing information to control the operation of each hydrocyclone arranged in the battery configuration, based upon the signaling received.

The method may include providing, with the control having a signal processor, the corresponding signal as control signaling to control the operation of each hydrocyclone arranged in the battery configuration.

According to some embodiments, the present invention may also take the form of a computer-readable storage medium having computer-executable components for performing the steps of the aforementioned method. The computer-readable storage medium may also include one or more of the features set forth above.

One advantage of the present invention is that it provides a better way to provide predictive maintenance and battery tuning for hydrocyclones in a battery configuration.

BRIEF DESCRIPTION OF THE DRAWING

The drawing includes FIGS. 1-3, which are not necessarily drawn to scale, as follows:

FIG. 1 is a block diagram of a system having a control with a signal processor for implementing signal processing functionality, according to some embodiments of the present invention.

FIG. 2 is a flowchart of a method or algorithm having steps for implementing signal processing functionality with a signal processor, according to some embodiments of the present invention.

FIG. 3 is a block diagram of a particle size tracking system having hydrocyclones and a control with a signal processor for implementing signal processing functionality for providing predictive maintenance and battery tuning for hydrocyclones in a battery configuration, according to some embodiments of the present invention.

DETAILED DESCRIPTION OF BEST MODE OF THE INVENTION

FIG. 1

By way of example, FIG. 1 shows a system generally indicated as 10 having a control 11 with at least one signal processor 12 for implementing the signal processing functionality according to some embodiments of the present invention. In operation, the at least one signal processor 12 may be configured to:
  receive signaling containing information about particle sizes of material flowing in pipes of hydrocyclones arranged in a battery configuration; and determine corresponding signaling containing information to control the operation of each hydrocyclone arranged in the battery configuration, based upon the signaling received.

By way of further example, the signal processor 12 may be configured to provide the corresponding signaling as a control signal to control the operation of each hydrocyclone arranged in the battery configuration, e.g., consistent with that described in relation to FIGS. 1 and 3.

The functionality of the signal processor or processor module 12 may be implemented using hardware, software, firmware, or a combination thereof. In a typical software implementation, the processor module 12 may include one or more microprocessor-based architectures having a microprocessor, a random access memory (RAM), a read only memory (ROM), input/output devices and control, data and address buses connecting the same, e.g., consistent with that shown in FIG. 2, e.g., see the other signal processor circuits or components 14. One skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

By way of example, the system 10 and/or the control 11 having the signal processor module 12 may also include, e.g., other signal processor circuits or components 14 that do not form part of the underlying invention, e.g., including input/output modules, one or more memory modules, data, address and control busing architecture, etc. In operation, the at least one signal processor 12 may cooperation and exchange suitable data, address and control signaling with the other signal processor circuits or components 14 in order to implement the signal processing functionality according to the present invention. By way of example, the signaling may be received by such an input module, provided along such a data bus and stored in such a memory module for later processing, e.g., by the at least one signal processor 12. After such later processing, processed signaling resulting from any such determination may be stored in such a memory module, provided from such a memory module along such a data bus to such an output module, then provided from such an output module as the corresponding signaling C, e.g., by the at least one signal processor 12, as the control signaling.

FIG. 2

FIG. 2 shows a method generally indicated as 20 having steps 20a, 20b and 20c for implementing the signal processing functionality or algorithm, e.g., with at least one signal processor like element 12 in FIG. 1, according to some embodiments of the present invention.

The method 20 may include a step 20a for receiving, with a signal processor like element 12, signaling containing information about particle sizes of material flowing in pipes of hydrocyclones arranged in a battery configuration, e.g., consistent with that set forth herein.

The method 20 may include a step 20b for determining, with the signal processor 12, corresponding signaling containing information to control the operation of each hydrocyclone arranged in the battery configuration, based upon the signaling received.

The method 20 may also include a step 20c for providing, with the signal processor 12, the corresponding signaling as control signaling to control the operation of each hydrocyclone arranged in the battery configuration.

The method may also include one or more steps for implementing other features of the present invention set forth herein, including steps for making the various determinations associated with one or more of the predictive maintenance and battery tuning algorithms or techniques, as well as the manifold distribution compensation algorithms or techniques, e.g., consistent with that set forth herein.

FIG. 3: The PST System 30

FIG. 3 shows a particle size tracking (PST) system generally indicated as 30 having a slurry flowing via incoming pipes or piping or a manifold 32 into one or more hydrocyclones 34 arranged in a battery configuration, and exiting the hydrocyclones 34 via one or more overflow pipes 36. The incoming pipes or piping or a manifold 32 may include individual input pipes 32a, as generally shown. The hydrocyclones 34 are arranged in the battery configuration having the one or more incoming pipes 32 for passing the slurry to the hydrocyclones 34, and also having the one or more overflow pipes 36 for providing a processed slurry from the hydrocyclones 34. The PST system 30 may include one or more individual cyclone PST sensors 40 (aka individual particle size detectors) arranged in relation to each of the one or more individual cyclones in the hydrocyclone 34 being evaluated and controlled. By way of example, and according to some embodiments, each individual particle size detector 40 may be configured on, or in, or in relation to, a respective individual input pipe 32a. Alternatively, by way of further example, and according to some embodiments, each individual particle size detector 40 may also be configured on, or in relation to, a respective overflow pipe 36. In operation, the respective individual cyclone control or sensor signaling x(i) may contain information about the particle size P(i) of particles passing into, through, or out of, each of the individual cyclones being evaluated and controlled; and the respective individual cyclone control or sensor signaling x(i) may be generated by the individual cyclone sensors 40 arranged on, in, or in relation to, each of the individual cyclones being evaluated and controlled.

The PST system 30 may also include at least one individual flow control valves 50 that responds to the control signaling C provided by the control 11 having the signal processor 12, and controls the flow of the material into the one or more hydrocyclones 34, e.g., including by regulating the flow rate and pressure the slurry flowing from the incoming piping 32, and/or one or more of the individual input pipes 32a, etc.

In FIG. 3, the PST system 30 may include the control 11 (see also FIG. 1) having the signal processor 12 for implementing signal processing control functionality as shown in FIG. 1, e.g., to control the slurry flowing from the incoming piping 32 and entering the hydrocyclones 34 arranged in the battery configuration.

The PST system 30 may also include other components indicated by 38 in the PST system that do not form part of the underlying invention, e.g., which would be understood and appreciate by one skilled in the art.

Hydrocyclones like element 34, cyclone sensors like element 40 and individual flow control valves 50 are known in the art, and the scope of the invention is not intended to be limited to any particular type or kind thereof, e.g., either now known or later developed in the future. By way of example, see the assignee's family of related hydrocyclone-related patent applications set forth above, as well as assignee's hydrocyclone products and patents set forth below.

Predictive Maintenance Algorithms

The predictive maintenance algorithms may include, or take the form of, an algorithm that tracks the particle size in relation to the performance of each hydrocyclone in the battery configuration over time, and records the performance, e.g., indexed by day and time. By way of example, the particle size of the slurry flowing into and/or out of each hydrocyclone may be measured and recorded, along with the flow rate and pressure of the material/slurry flowing into each hydrocyclone, as well as other known hydrocyclone parameters for control the flow and processing of the material. Over time, the tracked and recorded real time data may be compiled into a historical database for each hydrocyclone, as well as a collective historical database for combinations of hydrocyclones. Over time, the control may be configured to compare current real time tracked and recorded data to historical previously tracked and recorded real time data, and determine predictive maintenance based upon the same. By way of example, if the control compare a particle current real time tracked and recorded data to a particle historical previously tracked and recorded real time data, which in the past indicated a catastrophic failure of any particular hydrocyclone, combination of hydrocyclones, or the battery configuration, the control may determine a particular control signal for shutting down any particular hydrocyclone, combination of hydrocyclones, or the battery configuration, and schedule a corresponding maintenance event.

In operation, and by way of another particular example, the signaling processor may be configured to determine respective beginning performance signaling containing information about a respective beginning performance of each hydrocyclone based upon the respective tracked signaling stored at the respective beginning of the operation of each hydrocyclone arranged in the battery configuration; and determine the tracking or trending in the operation of each hydrocyclone arranged in the battery by comparing the respective current signaling to the respective beginning performance signaling. Based upon this comparison, the control may determine and/or provide a corresponding control signal to schedule a particular maintenance event at some immediate point or later point in in time.

In further operation, and by way of a further example, the signaling processor may be configured to determine median performance signaling containing information about a median performance of all of the hydrocyclones arranged in the battery; and determine the tracking or trending in the operation of each hydrocyclones arranged in the battery by comparing the respective current signaling to the median performance signaling. Based upon this comparison, the control may determine and/or provide a corresponding control signal to schedule a particular maintenance event at some immediate point or later point in time.

In operation, and by way of a still further example, the signaling processor may be configured to determine a respective performance degradation of each hydrocyclone based upon the respective tracked signaling containing varying nominal particle sizes for a given set of operational parameters within a lifetime of each hydrocyclone arranged in the battery configuration. Based upon this comparison, the control may determine and/or provide a corresponding control signal to schedule a particular maintenance event at some immediate point or later point in in time.

Further, and bay way of further example, the predictive maintenance algorithms may include, or take the form of, an algorithm that previously tracked the particle size and the performance of each hydrocyclone in a similar battery configuration over time that is known, which recorded the performance of the similar battery configuration, e.g., indexed by day and time. For example, a corresponding battery configuration may be implemented and running in a corresponding plant or facility for a substantially similar battery configuration of hydrocyclones, and a corresponding historical database and corresponding collective historical database may be available having tracked and stored data over may years and many maintenance cycles. In such a case, the corresponding historical database and corresponding collective historical database from the corresponding plant or facility may be used to predict maintenance and battery tuning for a new batter configuration in a new plant or facility.

Furthermore, the scope of the invention is not intended to be limited to any particular type or kind of algorithm for predictive maintenance and battery tuning based upon particle size tracking, e.g., that tracks and records the particle size in relation to any other particle type or kind of other hydrocyclone parameters or performance characteristic, or number of parameters or performance characteristics. In other words, the scope of the invention is intended to include, and embodiments are envisioned, using algorithms for predictive maintenance and battery tuning based upon particle size tracking in relation to hydrocyclone parameters and/or performance characteristic both now know and later developed in the future.

Furthermore still, the scope of the invention is not intended to be limited to any particular type or kind of algorithm for predictive maintenance and battery tuning based upon particle size tracking; and the scope of the invention is intended to include, and embodiments are envisioned, using algorithms for predictive maintenance and battery tuning, based upon particle size tracking and information related to the same, both now know and later developed in the future.

Furthermore still, the scope of the invention is intended to include, and embodiments are envisioned, using algorithms that track, record and use manifold distribution compensation information for predictive maintenance and battery tuning.

Manifold Distribution Compensation Algorithms

The manifold distribution compensation algorithms may include, or take the form of, an algorithm that tracks the particle size in relation to the manifold distribution of the slurry flowing into each hydrocyclone in the battery configuration over time, e.g., including recording the manifold distribution compensation indexed by day and time. In operation, the manifold distribution compensation algorithms may include techniques in which the signal processor 12 is configured to determine the corresponding signaling to control the individual flow control valves 32a on each hydrocyclone 34 arranged in the battery configuration to normalize passing particle sizes and equalize performances across all of the respective hydrocyclone 34 arranged in the battery configuration. By way of example, the tracking, recording, normalizing and equalizing of the manifold distribution compensation in this manner may, in effect, be used for, or form part of, the overall predictive maintenance and battery tuning, as well.

Furthermore, the scope of the invention is not intended to be limited to any particular type or kind of algorithm for manifold distribution compensation based upon particle size tracking; and the scope of the invention is intended to include, and embodiments are envisioned, using algorithms for manifold distribution compensation based upon particle size tracking and information related to the same, both now know and later developed in the future.

The Assignee's Hydrocyclone Products and Patents

By way of example, the assignee of the instant patent application has developed hydrocyclone products, which are disclosed in one or more of the following granted U.S. Pat. Nos. 6,354,147; 6,435,030; 6,587,798; 6,601,458; 6,609,069; 6,691,584; 6,732,575; 6,813,962; 6,862,920; 6,889,562; 6,988,411; 7,032,432; 7,058,549; 7,062,976; 7,086,278; 7,110,893; 7,121,152; 7,127,360; 7,134,320; 7,139,667; 7,146,864; 7,150,202; 7,152,003; 7,152,460; 7,165,464; 7,275,421; 7,359,803; 7,363,800; 7,367,240; 7,343,820; 7,437,946; 7,529,966; and 7,657,392, which are all incorporated by reference in their entirety. The disclosure herein related to the present invention is intended to be interpreted consistent with the family of technologies disclosed in all the issued patents incorporated by reference herein.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A system for providing battery tuning of hydrocyclones arranged in a battery configuration, comprising:
   particle size tracking sensors arranged in one or more pipes of hydrocyclones in the battery configuration and configured to detect particle sizes of material flowing in the one or more pipes of the hydrocyclones in the battery configuration, and provide signaling containing information about the particle sizes of the material flowing in the one or more pipes of the hydrocyclones in the battery configuration; and
   a control having a signal processor configured to:
      receive the signaling; and
      determine corresponding signaling containing information to control the operation of each hydrocyclone arranged in the battery configuration, based upon algorithm related to predictive maintenance, manifold distribution compensation or static hydrocyclone balancing of each hydrocyclone and the signaling received.

2. The system according to claim 1, wherein the signal processor is configured to provide the corresponding signal as control signaling to control the operation of each hydrocyclone arranged in the battery configuration.

3. The system according to claim 1, wherein the system is, or forms part of, a particle size tracking (PST) system.

4. The system according to claim 1, wherein the signaling processor is configured to store the signaling containing information about the particle sizes of the material flowing in a respective pipe of each hydrocyclone arranged in the battery configuration indexed by date as respective tracked signaling so that performance degradation of each hydrocyclone can be tracked and trended over time.

5. The system according to claim 4, wherein
   the signaling processor is configured to receive respective current signaling containing information about current particle sizes of material currently flowing in the respective pipe of each hydrocyclone arranged in the battery configuration; and
   the signaling processor is configured to determine a respective tracking or trending in the operation of each hydrocyclone arranged in the battery configuration by comparing the respective current signaling to the respective tracked signaling.

6. The system according to claim 5, wherein the signaling processor is configured to:
   determine respective beginning performance signaling containing information about a respective beginning performance of each hydrocyclone based upon the respective tracked signaling stored at the respective beginning of the operation of each hydrocyclone arranged in the battery configuration; and
   determine the tracking or trending in the operation of each hydrocyclone arranged in the battery by comparing the respective current signaling to the respective beginning performance signaling.

7. The system according to claim 5, wherein the signaling processor is configured to:
   determine median performance signaling containing information about a median performance of all of the hydrocyclones arranged in the battery; and
   determine the tracking or trending in the operation of each hydrocyclones arranged in the battery by comparing the respective current signaling to the median performance signaling.

8. The system according to claim 4, wherein the signaling processor is configured to determine a respective performance degradation of each hydrocyclone based upon the respective tracked signaling containing varying nominal particle sizes for a given set of operational parameters within a lifetime of each hydrocyclone arranged in the battery configuration.

9. The system according to claim 4, wherein the respective pipe is an overflow pipe.

10. The system according to claim 1, wherein the system comprises:
    a manifold configured to receive the material, and distribute the material flowing to individual input pipes of the hydrocyclones arranged in the battery configuration;
    each particle size tracking sensor configured in a respective one of the individual input pipes of the hydrocyclones arranged in the battery configuration; and
    individual flow control valves, each individual flow control valve also configured on the respective one of the individual input pipes of the hydrocyclones arranged in the battery configuration.

11. The system according to claim 10, wherein
    each individual particle size tracking sensor is configured to sense the respective particle sizes of respective material flowing in a respective pipe of a respective hydrocyclone arranged in the battery configuration, and provide respective sensed signaling containing information about the respective particle sizes of the respective material flowing in the respective pipe of the respective hydrocyclone arranged in the battery configuration; and the signaling received by the signal processor contains the respective sensed signaling containing information about the respective particle sizes of the respective material flowing in the respective pipe of all of the respective hydrocyclone arranged in the battery configuration.

12. The system according to claim 11, wherein the signal processor is configured to determine the corresponding signaling to control the individual flow control valves on each hydrocyclone arranged in the battery configuration to normalize passing particle sizes and equalize performances across all of the respective hydrocyclone arranged in the battery configuration.

13. The system according to claim 11, wherein the individual flow control valves are industrial pinch valves.

14. The system according to claim 11, wherein the individual flow control valves are gate valves configured to be manually adjusted between an ON state, an OFF state, and intermediate states between the ON state and the OFF state.

15. A method for providing battery tuning of hydrocyclones arranged in a battery configuration, comprising:
arranging particle size tracking sensors in one or more pipes of hydrocyclones in the battery configuration that are configured to detect particle sizes of material flowing in the one or more pipes of the hydrocyclones in the battery configuration, and provide signaling containing information about the particle sizes of the material flowing in the one or more pipes of the hydrocyclones in the battery configuration;
receiving, with a control having a signal processor, signaling containing information about particle sizes of material flowing in pipes of hydrocyclones arranged in a battery configuration; and
determining, with the control having a signal processor, corresponding signaling containing information to control the operation of each hydrocyclone arranged in the battery configuration, based upon algorithms related to predictive maintenance, manifold distribution compensation or static hydrocyclone balancing of each hydrocyclone and the signaling received.

16. The method according to claim 15, wherein the method comprises providing, with the control having a signal processor, the corresponding signal as control signaling to control the operation of each hydrocyclone arranged in the battery configuration.

17. The method according to claim 15, wherein the system is a particle size tracking (PST) system.

18. The method according to claim 15, wherein the method comprises storing, with the control having the signaling processor, the signaling containing information about the particle sizes of the material flowing in a respective pipe of each hydrocyclone arranged in the battery configuration indexed by date as respective tracked signaling so that performance degradation of each hydrocyclone can be tracked and trended over time.

19. The method according to claim 15, wherein the method comprises:
receiving, with the control having the signaling processor, respective current signaling containing information about current particle sizes of material currently flowing in the respective pipe of each hydrocyclone arranged in the battery configuration; and
determining, with the control having the signaling processor, a respective tracking or trending in the operation of each hydrocyclone arranged in the battery configuration by comparing the respective current signaling to the respective tracked signaling.

20. The method according to claim 19, wherein the method comprises:
determining, with the control having the signaling processor, respective beginning performance signaling containing information about a respective beginning performance of each hydrocyclone based upon the respective tracked signaling stored at the respective beginning of the operation of each hydrocyclone arranged in the battery configuration; and
determining, with the control having the signaling processor, the tracking or trending in the operation of each hydrocyclone arranged in the battery by comparing the respective current signaling to the respective beginning performance signaling.

21. The method according to claim 19, wherein the method comprises:
determining, with the control having the signaling processor, median performance signaling containing information about a median performance of all of the hydrocyclones arranged in the battery; and
determining, with the control having the signaling processor, the tracking or trending in the operation of each hydrocyclones arranged in the battery by comparing the respective current signaling to the median performance signaling.

22. The method according to claim 18, wherein the method comprises determining, with the control having the signaling processor, a respective performance degradation of each hydrocyclone based upon the respective tracked signaling containing varying nominal particle sizes for a given set of operational parameters within a lifetime of each hydrocyclone arranged in the battery configuration.

23. The method according to claim 18, wherein the respective pipe is an overflow pipe.

24. The method according to claim 15, wherein the method comprises:
receiving with a manifold the material, and distribute the material flowing to individual input pipes of the hydrocyclones arranged in the battery configuration;
arranging individual particle size tracking sensors in relation to the individual input pipes, by arranging each individual particle size tracking sensor in a respective one of the individual input pipes of the hydrocyclones arranged in the battery configuration; and
arranging individual flow control valves on the individual input pipes, by arranging each individual flow control valve on the respective one of the individual input pipes of the hydrocyclones arranged in the battery configuration.

25. The method according to claim 24, wherein the method comprises
arranging each individual particle size tracking sensor to sense the respective particle sizes of respective material flowing in a respective pipe of a respective hydrocyclone arranged in the battery configuration, and providing respective sensed signaling containing information about the respective particle sizes of the respective material flowing in the respective pipe of the respective hydrocyclone arranged in the battery configuration; and
receiving, with the control having the signal processor, the signaling that contains the respective sensed signaling containing information about the respective particle sizes of the respective material flowing in the respective pipe of all of the respective hydrocyclone arranged in the battery configuration.

26. The method according to claim 25, wherein the method comprises determining, with the control having the signal processor, the corresponding signaling to control the individual flow control valves on each hydrocyclone arranged in the battery configuration to normalize passing particle sizes and equalize performances across all of the respective hydrocyclone arranged in the battery configuration.

27. The method according to claim 26, wherein the method comprises using industrial pinch valves as the individual flow control valves.

28. The method according to claim 15, wherein the method comprises configuring the individual flow control valves as gate valves to be manually adjusted between an ON state, an OFF state, and intermediate states between the ON state and the OFF state.

* * * * *